(12) United States Patent
Liu (10) Patent No.: US 9,213,371 B2
(45) Date of Patent: Dec. 15, 2015

(54) PORTABLE ELECTRONIC DEVICE WITH A LIFTABLE KEYBOARD

(71) Applicant: Wistron Corporation, New Taipei (TW)

(72) Inventor: Li-Wei Liu, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 126 days.

(21) Appl. No.: 14/207,674

(22) Filed: Mar. 13, 2014

(65) Prior Publication Data

US 2014/0355188 A1 Dec. 4, 2014

(30) Foreign Application Priority Data

Jun. 3, 2013 (TW) .............................. 102119633 A (51) Int. Cl.
*G06F 1/16* (2006.01)

(52) U.S. Cl.
CPC ............ *G06F 1/1664* (2013.01); *G06F 1/1662* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,287,245 A * | 2/1994 | Lucente | ................ | G06F 1/1616 292/163 |
| 5,490,037 A * | 2/1996 | Clancy | .................. | G06F 1/1616 361/679.08 |
| 5,534,891 A * | 7/1996 | Takano | ................. | G06F 1/1616 345/169 |
| 5,543,787 A * | 8/1996 | Karidis | ................. | G06F 1/1616 341/20 |
| 5,706,167 A * | 1/1998 | Lee | ........................ | G06F 1/1664 361/679.02 |
| 5,729,480 A * | 3/1998 | Katoh | .................... | G06F 1/1616 708/142 |
| 5,734,548 A * | 3/1998 | Park | ....................... | G06F 1/1664 361/679.14 |
| 5,754,395 A * | 5/1998 | Hsu | ....................... | G06F 1/1667 361/679.11 |
| 5,818,360 A * | 10/1998 | Chu | ....................... | G06F 1/1667 248/118.3 |
| 6,008,983 A * | 12/1999 | Yen | ........................ | G06F 1/1616 248/917 |
| 6,008,986 A * | 12/1999 | Mok | ..................... | G06F 1/1616 361/679.12 |
| 6,028,768 A * | 2/2000 | Cipolla | ................. | G06F 1/1616 361/679.12 |
| 6,648,231 B1 * | 11/2003 | Chuang | ................ | G06F 1/1616 235/145 R |
| 6,853,543 B1 * | 2/2005 | Moore | .................. | G06F 1/1667 361/679.12 |
| 7,894,184 B2 * | 2/2011 | Huang | .................. | G06F 1/1616 361/679.11 |
| 7,907,393 B2 * | 3/2011 | Sellers | .................. | G06F 1/1637 312/223.1 |
| 8,773,353 B2 * | 7/2014 | Wei | ........................ | G06F 1/1662 345/156 |
| 9,025,324 B2 * | 5/2015 | Huang | ..................... | H05K 7/02 16/330 |
| 2005/0083645 A1 * | 4/2005 | Moore | .................. | G06F 1/1667 361/679.11 |
| 2010/0165560 A1 * | 7/2010 | Zhu | ........................ | G06F 1/1667 361/679.12 |
| 2013/0314860 A1 * | 11/2013 | Chen | ........................ | H05K 7/02 361/679.01 |
| 2014/0168876 A1 * | 6/2014 | Yeh | ....................... | G06F 1/1666 361/679.12 |
| 2014/0254080 A1 * | 9/2014 | Huang | .................. | G06F 1/1662 361/679.11 |
| 2015/0016039 A1 * | 1/2015 | Oakley | ................. | G06F 1/1666 361/679.12 |

* cited by examiner

*Primary Examiner* — Lisa Lea Edmonds
(74) *Attorney, Agent, or Firm* — Winston Hsu; Scott Margo (57) ABSTRACT

A portable electronic device includes a host module, a display module, a keyboard module and at least one pivoting module. The keyboard module is disposed on a cover of the host module. The keyboard module includes a supporting component, a frame disposed on the supporting component and a plurality of keycaps disposed on the frame. The at least one pivoting module is installed inside the host module and pivoted to the display module. The pivoting module includes a pivoting component pivoted to the display module, a linking component connected to the pivoting component and a driving device. The driving device is connected to the keyboard module and the linking component. When the display module rotates in a first rotating direction, the linking components moves with the pivoting component, so as to drive the driving device to drive the frame to press the plurality of the keycaps in a first direction.

20 Claims, 9 Drawing Sheets

PORTABLE ELECTRONIC DEVICE WITH A LIFTABLE KEYBOARD

BACKGROUND OF THE INVENTION

1. Field of the Invention

The present invention relates to a portable electronic device, and more specifically, to a portable electronic device with a liftable keyboard.

2. Description of the Prior Art

In the modern market, a slim design of a notebook computer becomes a mainstream. For example, an ultrabook computer is a favorite notebook computer for customers. A thickness of a host module of the notebook computer is designed to be very small, so that it has to adopt a keyboard module with a short keystroke to meet a requirement of slimness of the host module. However, the using experience of the keyboard module with the short keystroke is not good as one of a keyboard module with a long keystroke, and a lifetime of the keyboard module with the short keystroke is shorter than a lifetime of a normal keyboard module. Therefore, it is an important issue to design a portable electronic device which conforms to the slim design and has a keyboard module with the long keystroke.

SUMMARY OF THE INVENTION

The present invention is to provide a portable electronic device with a liftable keyboard to solve above problems.

According to the disclosure, a portable electronic device includes a host module, a display module, a keyboard module and at least one pivoting modules. The keyboard module is disposed in a cover of the host module. The keyboard module includes a supporting component, a frame disposed on the supporting component and a plurality of keycaps disposed on the frame. The at least one pivoting modules is installed inside the host module and pivoted to the display module for pivoting the display module relative to the host module in a first rotating direction. The pivoting module includes a pivoting component, a linking component and a driving device. The pivoting component is pivoted to the display module, and the pivoting component is driven to rotate when the display module is rotated relative to the host module. An end of the linking component is rotatably connected to the pivoting component. An end of the driving device is connected to the keyboard module, and the other end of the driving device is connected to the other end of the linking component. The linking component moves with the pivoting component simultaneously in the first rotating direction, so as to drive the driving device to drive the frame to press the plurality of the keycaps in a first direction when the display module rotates in the first rotating direction relative to the host module.

According to the disclosure, the driving device includes a first driving component and a second driving component. An end of the first driving component is pivoted to the other end of the linking component, and the other end of the first driving component is detachably connected to the frame. An end of the second driving component is connected to the first driving component, and the other end of the second driving component is connected to the cover. The pivoting component drives the linking component to rotate in a second rotating direction opposite to the first rotating direction as the display module rotates in the second rotating direction relative to the host module, so as to drive the first driving component to rotate in the first rotating direction and to drive the second driving component to rotate in the second rotating direction, so that the first driving component drives the frame to move in a second direction opposite to the first direction.

According to the disclosure, the driving device further includes a pushing block disposed on the second driving component, and the pushing block contacts against the frame as the second driving component rotates in the second rotating direction, so as to drive the frame to move in the second direction.

According to the disclosure, the supporting component of the keyboard module comprises two resilient structures respectively disposed under two sides of the frame for supporting the frame.

According to the disclosure, two guiding tracks are formed on two sides of the cover, two sliding blocks corresponding to the two guiding tracks are formed on the frame, and the two guiding tracks are for guiding the two sliding blocks, so that the frame moves in the first direction relative to the cover.

According to the disclosure, an aperture structure is formed under the frame, and the other end of the first driving component passes through the aperture structure.

According to the disclosure, a hook is formed on the other end of the first driving component for preventing the first driving component from separating from the aperture structure of the frame.

According to the disclosure, the supporting component of the keyboard module comprises two resilient structures respectively disposed under two sides of the frame for pushing the frame to move in a second direction opposite to the first direction to a fixed position to support the frame.

According to the disclosure, the driving device is a linkage component, an end of the linkage component is pivoted to the frame, the other end of the linkage component is pivoted to the linking component, as the display module rotates in the first rotating direction relative to the host module, the linking component moves in the first rotating direction with the pivoting component simultaneously, so as to drive the linkage component to rotate in a second rotating direction opposite to the first rotating direction to drive the frame to press the plurality of the keycaps in the first direction, and as the display module rotates in the second rotating direction relative to the host module, the pivoting component drives the linking component to rotate in the second rotating direction, so as to drive the linkage component to rotate in the first rotating direction to push the frame to move in a second direction opposite to the first direction.

According to the disclosure, the supporting component of the keyboard module comprises two resilient structures respectively disposed under two sides of the frame for pushing the frame to move in the second direction opposite to the first direction to a fixed position to support the frame.

According to the disclosure, a top surface of each keycap is aligned to a surface of the cover as the frame drives the plurality of the keycaps to move in the first direction.

According to the disclosure, a plurality of holes is formed on the frame, the plurality of the keycaps passes through the plurality of holes respectively, a protrusion is formed on a bottom of each keycap, and the frame presses the protrusion of each keycap as the driving device drives the frame to move in the first direction to drive the plurality of the keycaps.

According to the disclosure, the portable electronic device comprises two pivoting modules disposed on two opposite sides of the host module respectively.

According to the disclosure, a keyboard driving device is installed inside an electronic device for driving a keyboard module. The electronic device has a host module, which includes a cover whereon an opening is formed, and a display module . The keyboard driving device includes a supporting component connected to the cover, a frame disposed on the supporting component and a plurality of keycaps disposed on the frame. The at least one pivoting module is installed inside the host module and pivoted to the display module for rotating the display module in a first rotating direction relative to the host module. The at least one pivoting module includes a pivoting component, a linking component and a driving device. The pivoting component is pivoted to the display module, and the pivoting component is driven to rotate when the display module is rotated relative to the host module. An end of the linking component is rotatably connected to the pivoting component. An end of the driving device is connected to the keyboard module, and the other end of the driving device is connected to the other end of the linking component. The linking component moves with the pivoting component simultaneously in the first rotating direction, so as to drive the driving device to drive the frame to press the plurality of the keycaps in a first direction when the display module rotates in the first rotating direction relative to the host module.

According to the disclosure, the driving device includes a first driving component and a second driving component. An end of the first driving component is pivoted to the other end of the linking component, and the other end of the first driving component is detachably connected to the frame. An end of the second driving component is connected to the first driving component, and the other end of the second driving component is connected to the cover. The pivoting component drives the linking component to rotate in a second rotating direction opposite to the first rotating direction as the display module rotates in the second rotating direction relative the host module, so as to drive the first driving component to rotate in the first rotating direction and to drive the second driving component to rotate in the second rotating direction, so that the first driving component drives the frame to move in a second direction opposite to the first direction.

According to the disclosure, the driving device further includes a pushing block disposed on the second driving component, and the pushing block contacts against the frame as the second driving component rotates in the second rotating direction, so as to drive the frame to move in the second direction.

According to the disclosure, the supporting component of the keyboard module includes two resilient structures respectively disposed under two sides of the frame for supporting the frame.

According to the disclosure, a plurality of holes is formed on the frame, the plurality of the keycaps passes through the plurality of holes respectively, a protrusion is formed on a bottom of each keycap, and the frame presses the protrusion of each keycap as the driving device drives the frame to move in the first direction to drive the plurality of the keycaps.

The display module of the present invention can be rotated to drive the pivoting component to drive the linking component, so as to drive the driving device to drive the frame to press the plurality of keycaps in the first direction, so that the top surfaces of each keycap is aligned to the surface of the cover as the display module is in the closed state. Therefore, as the host module is covered with the display module, the plurality of keycaps does not contact against the display module. That is, as the display module is in the open state relative to the host module, the top surface of each keycap protrudes outside the surface of the cover. As a result, in contrast to the keycap in the prior art, the keycap of the keyboard module of the present invention can has a long keystroke, and the keyboard module can not only be used in an ultrabook computer but also have the long keystroke due to a structure design of the present invention, bringing the user the better using experience. Therefore, it can solve a conventional problem that it has to adopt a keyboard module with a short keystroke due to a very small thickness of the host module of the ultrabook computer, resulting in bringing the user a poor using experience.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
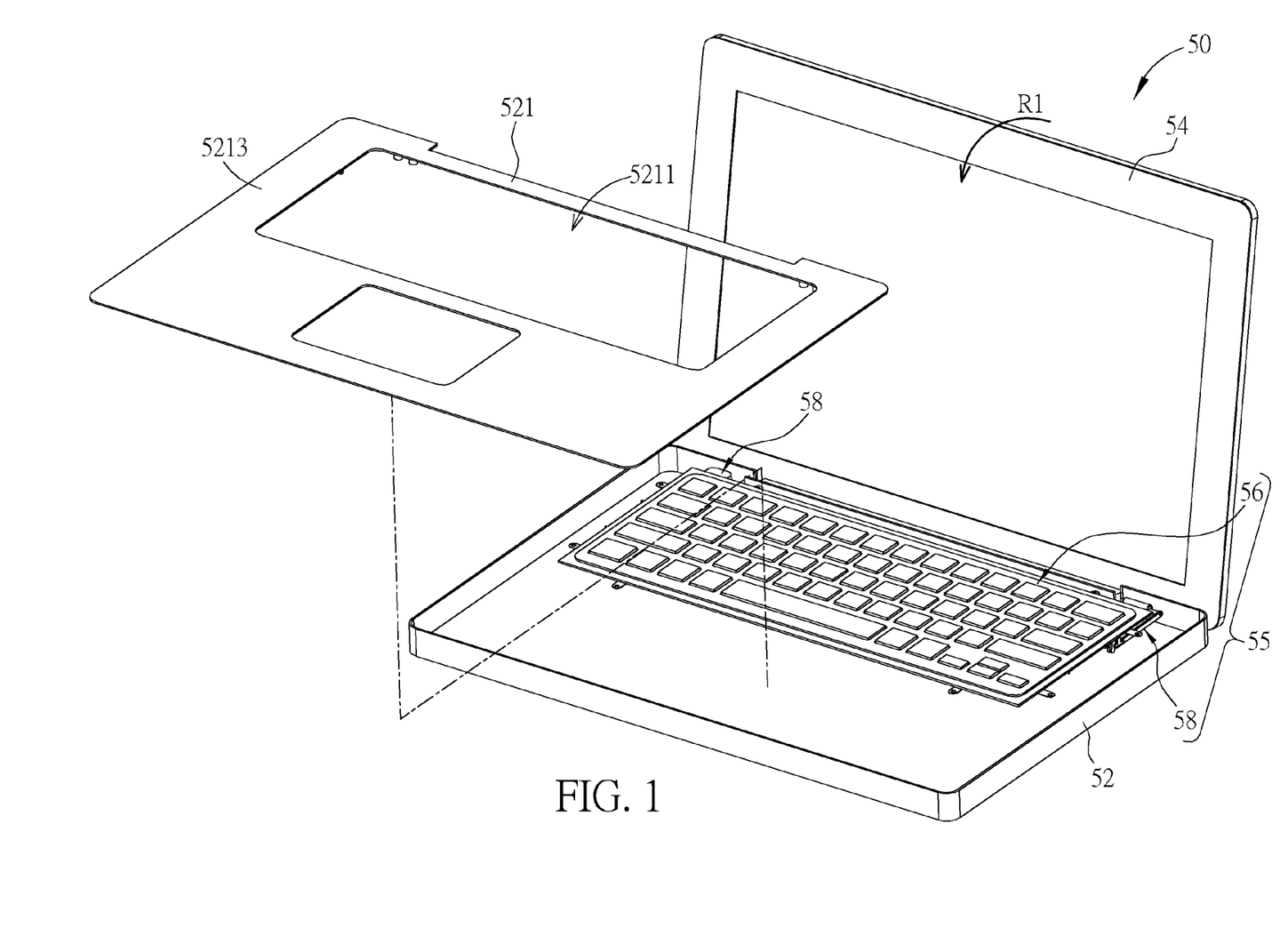
FIG. 1 is a diagram of a portable electronic device according to an embodiment of the present invention.
Figure 2:
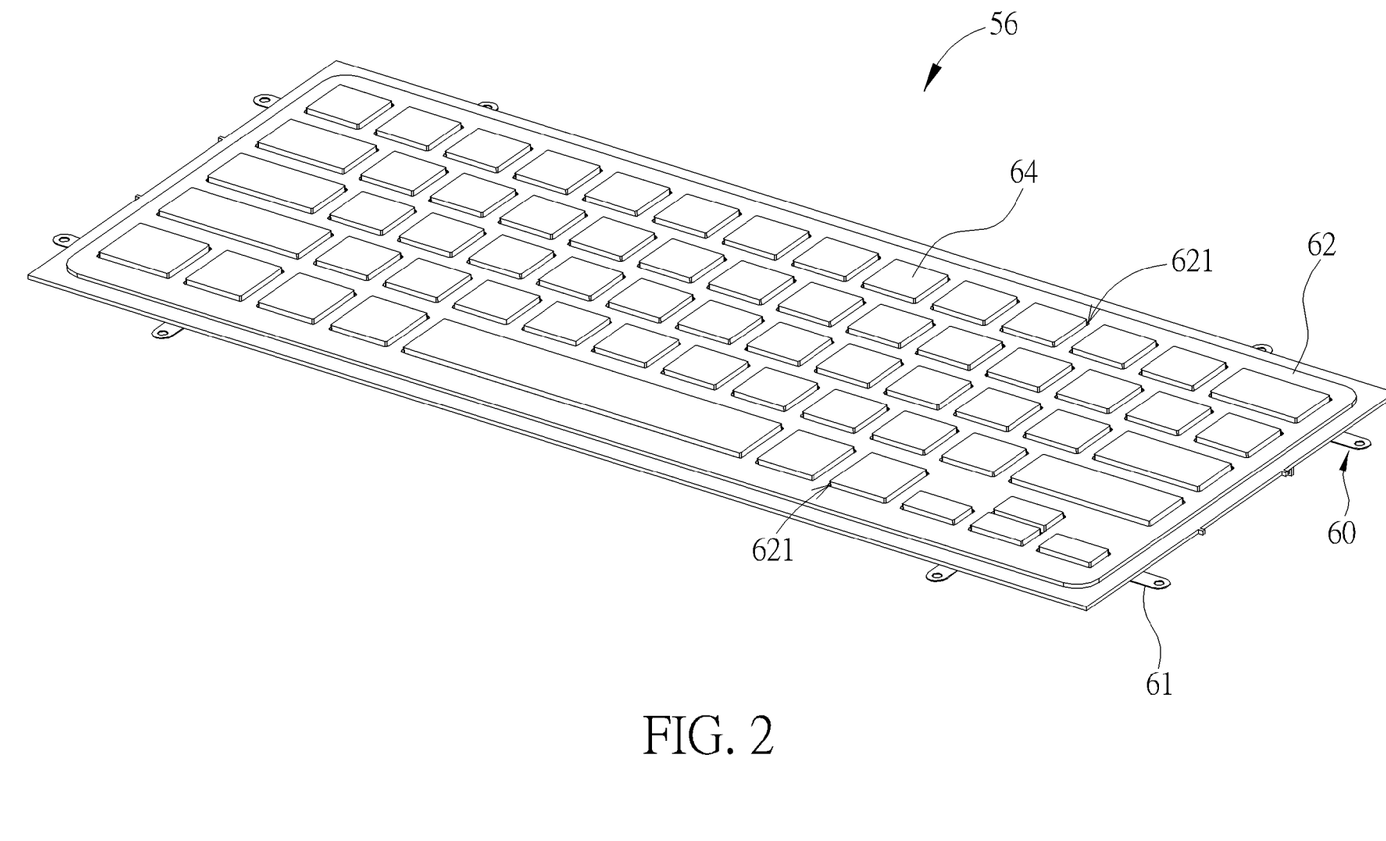
FIG. 2 is a diagram of a keyboard module according to the embodiment of the present invention.

Please refer to FIG. 1. FIG. 1 is a diagram of a portable electronic device 50 according to an embodiment of the present invention. The portable electronic device 50 includes a host module 52, a display module 54 and a keyboard driving device 55. The keyboard driving device 55 includes a keyboard module 56 and at least one pivoting module 58. In this embodiment, the portable electronic device 50 can include two pivoting modules 58 disposed on two opposite sides of the host module 52 respectively. The portable electronic device 50 can be a notebook computer, the host module 52 is for controlling operation of the portable electronic device 50, and the host module 52 includes various electronic components, such as a CPU, a hard drive, a fan, a memory, an expansion card, and so on. The host module 52 includes a cover 521 whereon an opening 5211 is formed. The display module 54 is for displaying image information processed by the host module 52. Please refer to FIG. 1 and FIG. 2. FIG. 2 is a diagram of the keyboard module 56 according to the embodiment of the present invention. The keyboard module 56 is to be installed in the opening 5211 of the cover 521 of the host module 52. The keyboard module 56 includes a supporting component 60 connected to the cover 521, a frame 62 disposed on the supporting component 60 and a plurality of keycaps 64 disposed on the frame 62. The supporting component 60 can be a rectangular-shaped metal piece, and a plurality of extension portions 61 is formed on the supporting component 60. The plurality of extension portions 61 is connected to the cover 521, and the frame 62 and the plurality of keycaps 64 are disposed on the supporting component 60. A plurality of holes 621 is formed on the frame 62, and the plurality of the keycaps 64 can pass through the plurality of holes 621 respectively.

Figure 3:
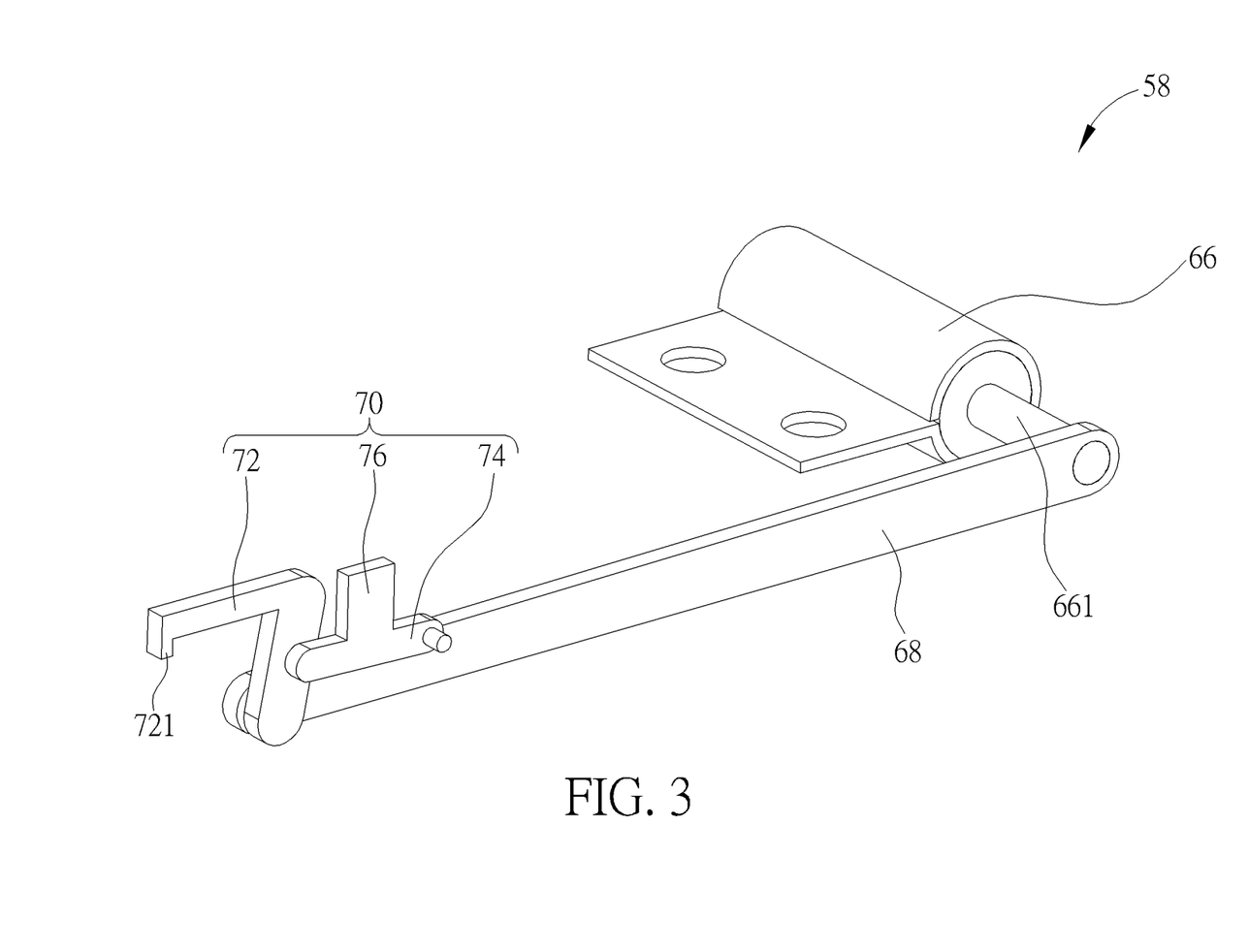
FIG. 3 is a diagram of a pivoting module according to the embodiment of the present invention.
Figure 4:
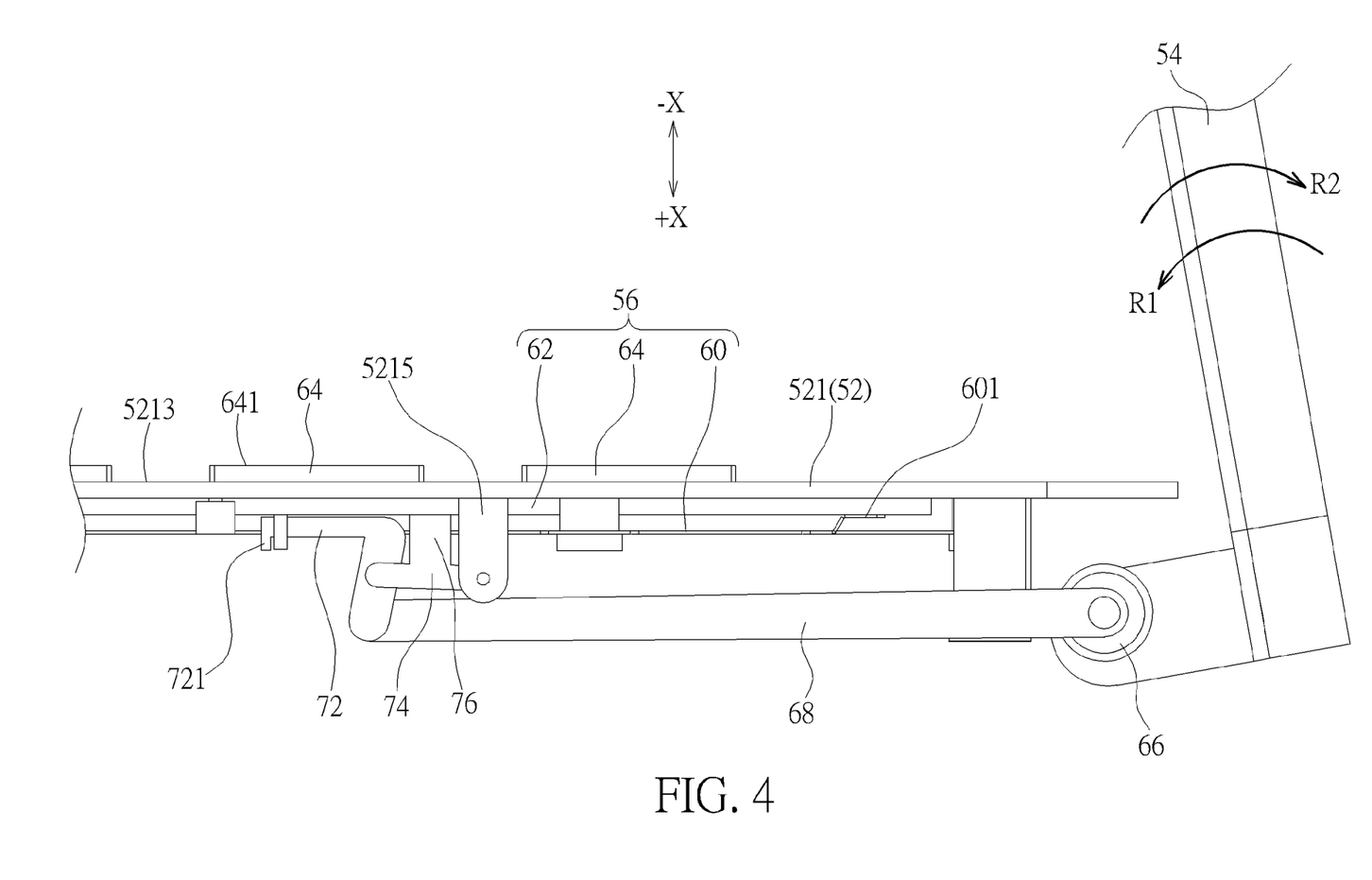
FIG. 4 to FIG. 6 are partial structural diagrams of the portable electronic device in different states according to the embodiment of the present invention.
Figure 5:
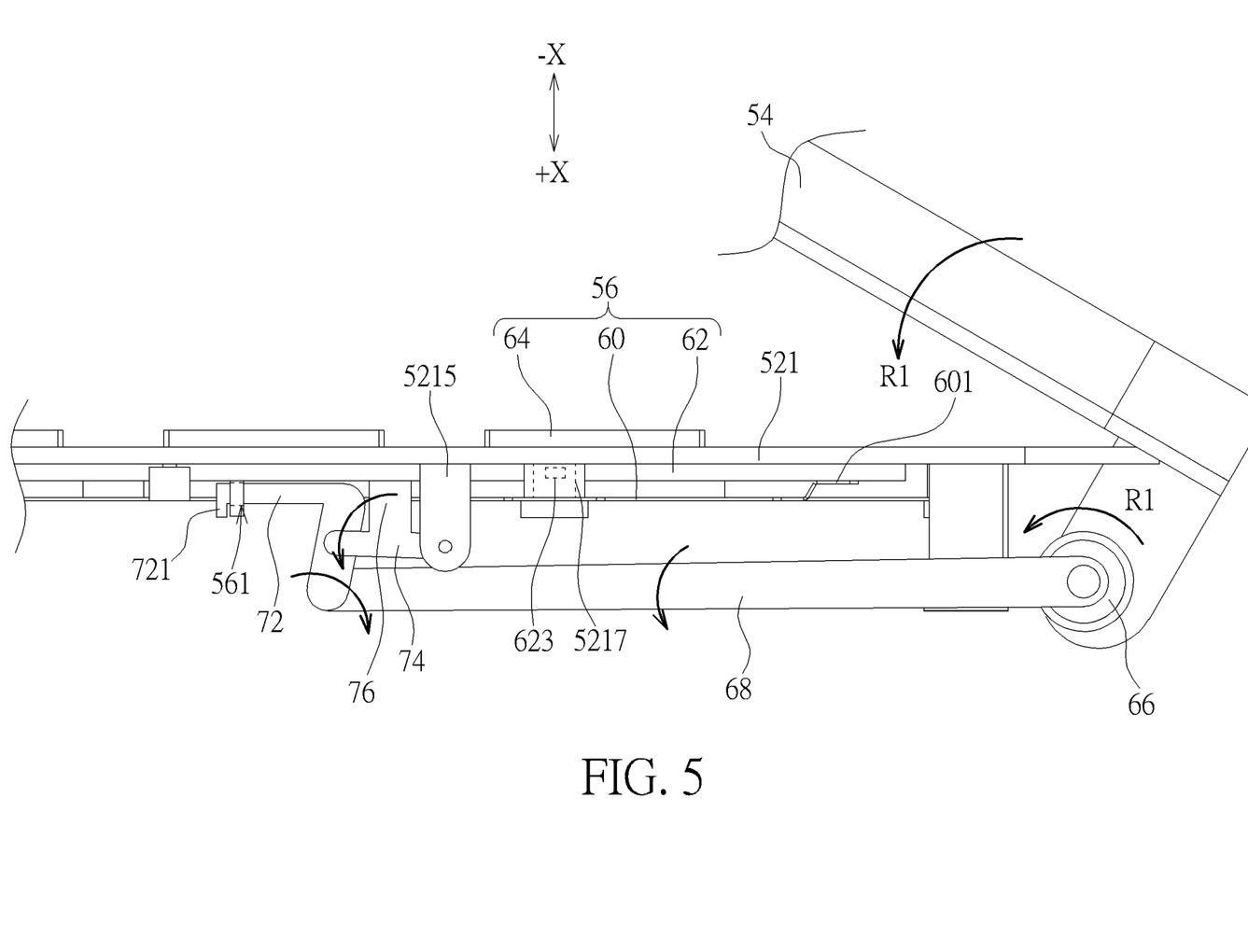
Figure 6:
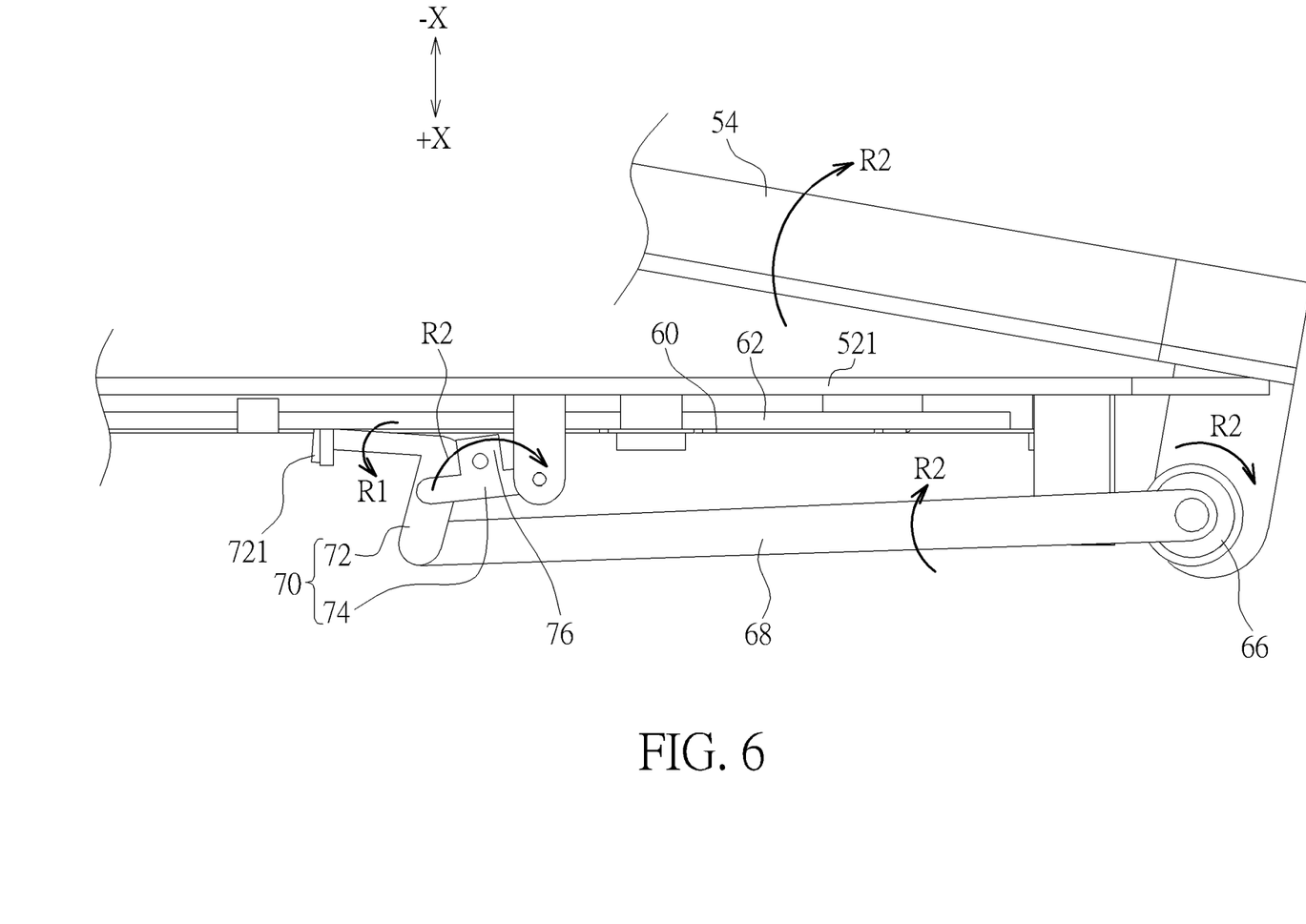

Please refer to FIG. 1 to FIG. 3. FIG. 3 is a diagram of the pivoting module 58 according to the embodiment of the present invention. The two pivoting modules 58 are installed inside the host module 52 and pivoted to the display module 54 for pivoting the display module 54 in a first rotating direction R1 relative to the host module 52. Each pivoting module 58 includes a pivoting component 66, a linking component 68 and a driving device 70. The pivoting component 66 is pivoted to the display module 54, and the pivoting component 66 is driven to rotate by rotation of the display module 54. In addition, a shaft 661 is formed on the pivoting component 66. An end of the linking component 68 is rotatably connected to the shaft 661 of the pivoting component 66. As the display module 54 rotates relative to the host module 52 and drives the pivoting component 66 to rotate, a rotating angle of the pivoting component 66 can be designed not to be the same as a rotating angle of the linking component 68. In this embodiment, the shaft 661 of the pivoting component 66 can be designed to be rotatably connected to the linking component 68, and the rotating angle of the pivoting component 66 is greater than the rotating angle of the linking component 68. For example, as the pivoting component 66 rotates about 45 degrees, the linking component 68 only rotates about 15 degrees relative to the shaft 661 of the pivoting component 66. Please refer to FIG. 4 to FIG. 6. FIG. 4 to FIG. 6 are partial structural diagrams of the portable electronic device 50 in different states according to the embodiment of the present invention. An end of the driving device 70 is detachably connected to the frame 62 of the keyboard module 56, and the other end of the driving device 70 is connected to the other end of the linking component 68. As the display module 54 rotates in the first rotating direction R1 relative to the host module 52, the linking component 68 moves in the first rotating direction R1 with the pivoting component 66 simultaneously in the first rotating direction R1, so as to drive the driving device 70 to drive the frame 62 to press down the plurality of the keycaps 64 in a first direction (+X direction). In this embodiment, as the driving device 70 drives the frame 62 in the first direction (+X direction) to drive the plurality of keycaps 64, a top surface 641 of each keycap 64 can be aligned to a surface 5213 of the cover 521. Therefore, as the host module 52 is covered with the display module 54, the plurality of keycaps 64 of the keyboard module 56 does not contact the display module 54 and does not scratch a surface of the display module 54.

In this embodiment, as shown in FIG. 4 to FIG. 6, the driving device 70 can include a first driving component 72 and a second driving component 74. An end of the first driving component 72 is pivoted to the other end of the linking component 68, and the other end of the first driving component 72 is detachably connected to the frame 62, but is not limited to it. For example, the other end of the first driving component 72 of the driving device 70 can be pivoted to the frame 62. In this embodiment, an aperture structure 561 can be formed under the frame 62, and the other end of the first driving component 72 passes through the aperture structure 561. An end of the second driving component 74 is connected to the first driving component 74, and the other end of the second driving component 74 is connected to a plate 5215 of the cover 521. A hook 721 is formed on the other end of the first driving component 72 for preventing the first driving component 72 from separating from the aperture structure 561 of the frame 62 as the first driving component 72 moves. In addition, the driving device 70 can further include a pushing block 76 disposed on the second driving component 74, and the pushing block 76 can contact against a bottom of the frame 62. Furthermore, the supporting component 60 of the keyboard module 56 includes two resilient structures 601 respectively disposed under two opposite sides of the frame 62 for pushing the frame 62 to move in a second direction (−X direction) opposite to the first direction (+X direction) to a fixed position to support the frame 62.

Figure 7:
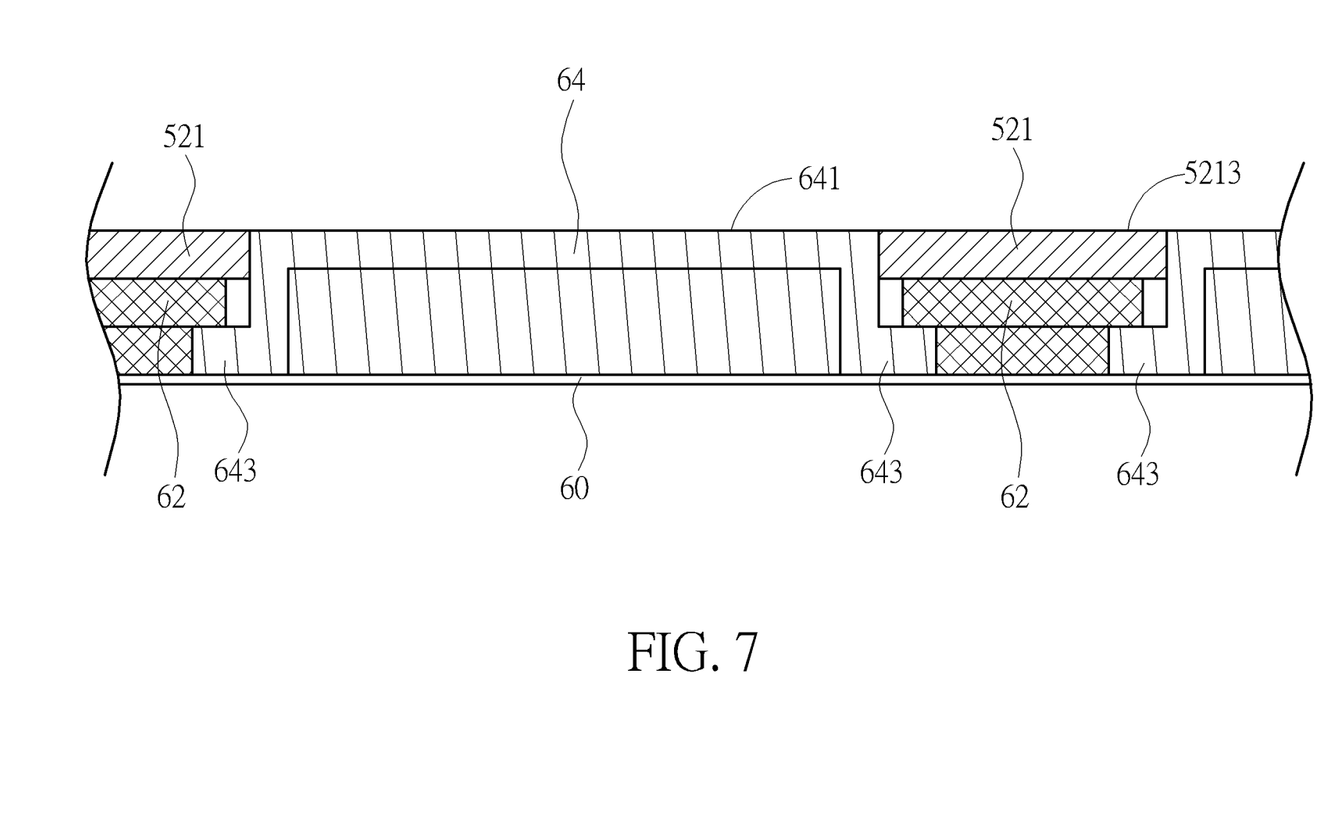
FIG. 7 is a sectional view of the keyboard module according to the embodiment of the present invention.

Please refer to FIG. 4 to FIG. 7. FIG. 7 is a sectional view of the keyboard module 56 according to the embodiment of the present invention. In this embodiment, a protrusion 643 is formed on a bottom of each keycap 64, and as the driving device 70 drives the frame 62 to move in the first direction (+X direction) to drive the plurality of the keycaps 64, the frame 62 presses the protrusion 643 of each keycap 64, so as to drive the plurality of keycaps 64 to move in the first direction (+X direction). As the display module 54 is rotated in the first rotating direction R1 relative to the host module 52, as shown in FIG. 5 and FIG. 4, the display module 54 drives the pivoting component 66 to rotate, and the pivoting component 66 also drives the linking component 68 to rotate in the first rotating direction R1, so as to drive the first driving component 72 to rotate in a second rotating direction R2 opposite to the first rotating direction R1 and to drive the second driving component 74 to rotate in the first rotating direction R1. Therefore, as shown in FIG. 6, the pushing block 76 which contacts against the bottom of the frame 62 is to separate from the bottom of the frame 62. At this time, the first driving component 72 pulls the frame 62 to move in the first direction (+X direction), so that the frame 62 presses down the plurality of keycaps 64 in the first direction (+X direction). Finally, as shown in FIG. 6 and FIG. 7, the top surfaces 641 of the plurality of keycaps 64 are aligned to the surface 5213 of the cover 521. Hence, as the host module 52 is covered with the display module 54, the plurality of keycaps 64 of the keyboard module 56 does not contact the display module 54. Because of this structure design of the keyboard module 56, the keyboard module 56 can be applied to the ultra slim portable electronic device 50, and each keycap 64 can have a longer keystroke at the same time. That is, as the display module 54 is in an open state relative to the host module 52, the top surface 641 of each keycap 64 protrudes outside the surface 5213 of the cover 521. Therefore, in contrast to conventional keycaps, the keycap 64 of the present invention can have a longer keystroke, and it can bring a user the better using experience. As the display module 54 rotates in the first rotating direction R1 to a closed state relative to the host module 52, the top surface 641 of each keycap 62 is aligned to the surface 5213 of the cover 521, and it renders a sinkable mechanical design. In addition, in this embodiment, two guiding tracks 5217 can be formed on two opposite sides of the cover 521, and two sliding blocks 623 corresponding to the two guiding tracks 5217 can be formed on the frame 62. The two guiding tracks 5217 are for guiding the two sliding blocks 623, so that the frame 62 can move in the first direction (+X direction) relative to the cover 521 correctly.

As the user is desired to open the portable electronic device 50 from the closed state, as shown in FIG. 6, the display module 54 can be rotated in the second rotating direction R2 relative to the host module 52, and the display module 54 drives the pivoting component 66 to rotate in the second rotating direction R2 at this time. In addition, the pivoting component 66 also drives the linking component 68 to rotate in the second rotating direction R2, so as to drive the first driving component 72 to rotate in the first rotating direction R1 and to drive the second driving component 74 to rotate in the second rotating direction R2, so that the first driving component 72 drives the frame 62 to move in the second direction (−X direction). At this time, the pushing block 76 is driven to contact against the frame 62 because the second driving component 74 rotates in the second rotating direction R2, so as to drive the frame 62 to move in the second direction (−X direction). Finally, as the display module 54 rotates in the second rotating direction R2 relative to the host module 52 to a position shown in FIG. 5, the frame 62 is driven to the fixed position and drives the plurality of keycaps 64 to return to a using position. At this time, the two resilient structures 601 rebound upward in the second direction (−X direction) and support the frame 62 with the pushing block 76 of the second driving component 74 cooperatively. Therefore, the user can use the keyboard module 56 normally, and the frame 62 and the plurality of keycaps 64 are not driven to move in the first direction (+X direction) when the user presses the keyboard module 56.

Figure 8:
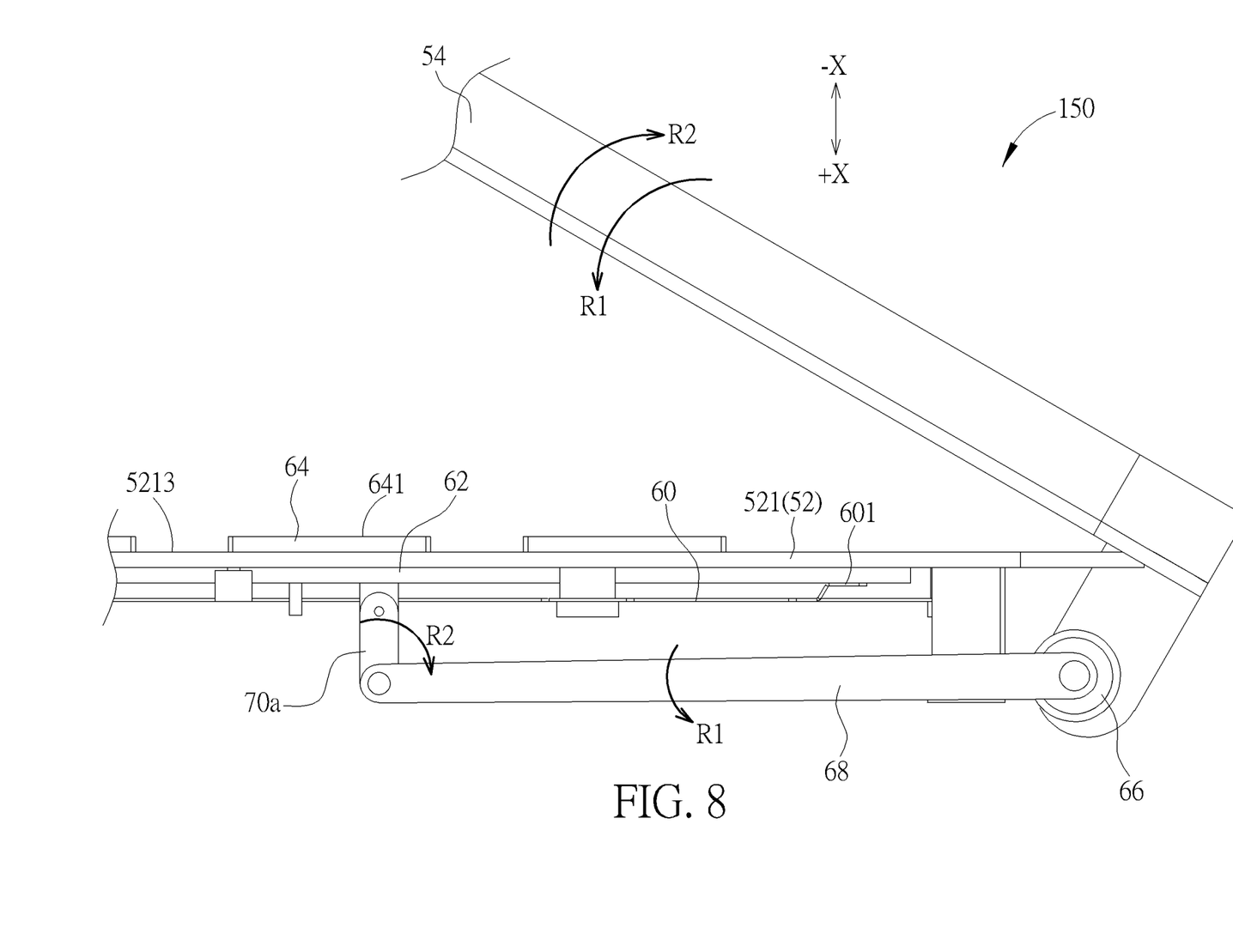
FIG. 8 and FIG. 9 are partial structural diagrams of a portable electronic device according to another embodiment of the present invention.
Figure 9:
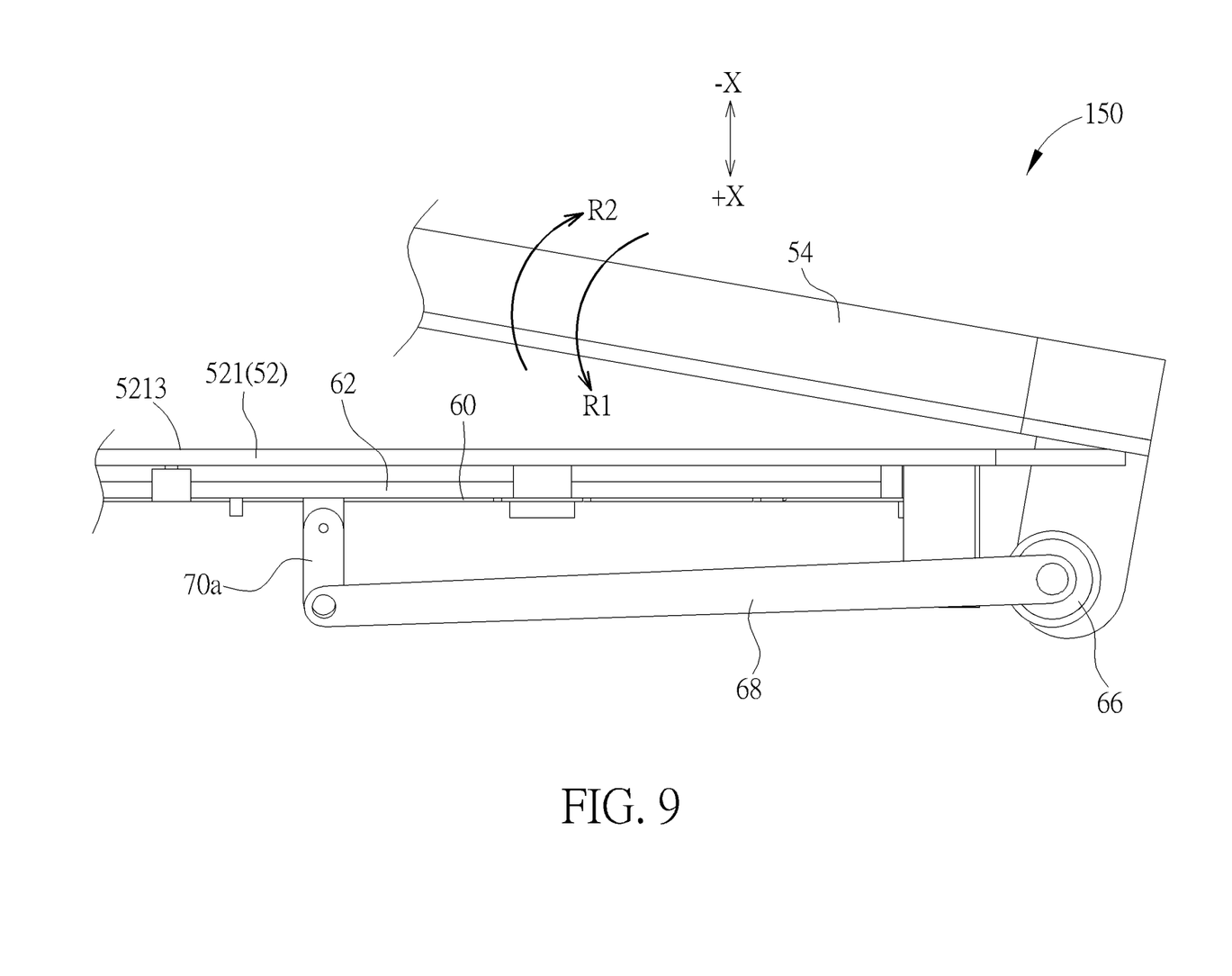

Please refer to FIG. 8 and FIG. 9. FIG. 8 and FIG. 9 are partial structural diagrams of a portable electronic device 150 according to another embodiment of the present invention. In this embodiment, the driving device 70a is a single linkage component. An end of the linkage component is pivoted to the frame 62, and the other end of the linkage component is pivoted to the linking component 68. As shown in FIG. 8, as the display module 54 rotates in the first rotating direction R1 relative to the host module 52, the linking component 68 moves in the first rotating direction R1 with the pivoting component 66 simultaneously, so as to drive the linkage component to rotate in the second rotating direction R2 to drive the frame 62 to press down the plurality of the keycaps 64 in the first direction (+X direction), so that the top surface 641 of each keycap 64 can be aligned to the surface 5213 of the cover 521, as shown in FIG. 7 and FIG. 9. As the user is desired to open the portable electronic device 50 from the closed state, as shown in FIG. 9, the display module 54 can be rotated in the second rotating direction R2 relative to the host module 52, and the pivoting component 66 drives the linking component 68 to rotate in the second rotating direction R2, so as to drive the linkage component to rotate in the first rotating direction R1 to push the frame 62 to move in the second direction (−X direction). Similarly, the supporting component 60 in this embodiment includes two resilient structures 601 respectively disposed under the two opposite sides of the frame 62 for pushing the frame 62 to move in the second direction (−X direction) opposite to the first direction (+X direction) to the fixed position to support the frame 62.

In contrast to the prior art, the display module of the present invention can be rotated to drive the pivoting component to drive the linking component, so as to drive the driving device to drive the frame to press down the plurality of keycaps in the first direction, so that the top surfaces of each keycap is aligned to the surface of the cover as the display module is in the closed state. Therefore, as the host module is covered with the display module, the plurality of keycaps does not contact against the display module. That is, as the display module is in the open state relative to the host module, the top surface of each keycap protrudes outside the surface of the cover. As a result, in contrast to the keycap in the prior art, the keycap of the keyboard module of the present invention can has a long keystroke, and the keyboard module can not only be used in an ultrabook computer but also have the long keystroke due to a structure design of the present invention, bringing the user the better using experience. Therefore, it can solve a conventional problem that it has to adopt a keyboard module with a short keystroke due to a very small thickness of the host module of the ultrabook computer, resulting in bringing the user a poor using experience.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A portable electronic device, comprising:
   a host module comprising a cover whereon an opening is formed;
   a keyboard module disposed in the opening of the cover of the host module, the keyboard module comprising:
      a supporting component connected to the cover;
      a frame disposed on the supporting component; and
      a plurality of keycaps disposed on the frame;
   a display module; and
   at least one pivoting module installed inside the host module and pivoted to the display module for rotating the display module in a first rotating direction relative to the host module, the at least one pivoting module comprising:
      a pivoting component pivoted to the display module, the pivoting component being driven to rotate when the display module is rotated relative to the host module;
      a linking component, an end of the linking component being rotatably connected to the pivoting component; and
      a driving device, an end of the driving device being connected to the keyboard module, the other end of the driving device being connected to the other end of the linking component, and the linking component moving with the pivoting component simultaneously in the first rotating direction, so as to drive the driving device to drive the frame to press the plurality of the keycaps in a first direction when the display module rotates in the first rotating direction relative to the host module.

2. The portable electronic device of claim 1, wherein the driving device comprises:
   a first driving component, an end of the first driving component being pivoted to the other end of the linking component, and the other end of the first driving component being detachably connected to the frame; and
   a second driving component, an end of the second driving component being connected to the first driving component, the other end of the second driving component being connected to the cover, the pivoting component driving the linking component to rotate in a second rotating direction opposite to the first rotating direction as the display module rotates in the second rotating direction relative the host module, so as to drive the first driving component to rotate in the first rotating direction and to drive the second driving component to rotate in the second rotating direction, so that the first driving component drives the frame to move in a second direction opposite to the first direction.

3. The portable electronic device of claim 2, wherein the driving device further comprises a pushing block disposed on the second driving component, and the pushing block contacts against the frame as the second driving component rotates in the second rotating direction, so as to drive the frame to move in the second direction.

4. The portable electronic device of claim 3, wherein the supporting component of the keyboard module comprises two resilient structures respectively disposed under two sides of the frame for supporting the frame.

5. The portable electronic device of claim 2, wherein two guiding tracks are formed on two sides of the cover, two sliding blocks corresponding to the two guiding tracks are formed on the frame, and the two guiding tracks are for guiding the two sliding blocks, so that the frame moves in the first direction relative to the cover.

6. The portable electronic device of claim 2, wherein an aperture structure is formed under the frame, and the other end of the first driving component passes through the aperture structure.

7. The portable electronic device of claim 6, wherein a hook is formed on the other end of the first driving component for preventing the first driving component from separating from the aperture structure of the frame.

8. The portable electronic device of claim 1, wherein the supporting component of the keyboard module comprises two resilient structures respectively disposed under two sides of the frame for pushing the frame to move in a second direction opposite to the first direction to a fixed position to support the frame.

9. The portable electronic device of claim 1, wherein two guiding tracks are formed on two sides of the cover, two sliding blocks corresponding to the two guiding tracks are formed on the frame, and the two guiding tracks are for guiding the two sliding blocks, so that the frame moves in the first direction relative to the cover.

10. The portable electronic device of claim 1, wherein the driving device is a linkage component, an end of the linkage component is pivoted to the frame, the other end of the linkage component is pivoted to the linking component, as the display module rotates in the first rotating direction relative to the host module, the linking component moves in the first rotating direction with the pivoting component simultaneously, so as to drive the linkage component to rotate in a second rotating direction opposite to the first rotating direction to drive the frame to press the plurality of the keycaps in the first direction, and as the display module rotates in the second rotating direction relative to the host module, the pivoting component drives the linking component to rotate in the second rotating direction, so as to drive the linkage component to rotate in the first rotating direction to push the frame to move in a second direction opposite to the first direction.

11. The portable electronic device of claim 10, wherein the supporting component of the keyboard module comprises two resilient structures respectively disposed under two sides of the frame for pushing the frame to move in the second direction opposite to the first direction to a fixed position to support the frame.

12. The portable electronic device of claim 10, wherein a top surface of each keycap is aligned to a surface of the cover as the frame drives the plurality of the keycaps to move in the first direction.

13. The portable electronic device of claim 1, wherein a plurality of holes is formed on the frame, the plurality of the keycaps passes through the plurality of holes respectively, a protrusion is formed on a bottom of each keycap, and the frame presses the protrusion of each keycap as the driving device drives the frame to move in the first direction to drive the plurality of the keycaps.

14. The portable electronic device of claim 1, wherein the portable electronic device comprises two pivoting modules disposed on two opposite sides of the host module respectively.

15. The portable electronic device of claim 1, wherein a top surface of each keycap is aligned to a surface of the cover as the frame drives the plurality of the keycaps to move in the first direction.

16. A keyboard driving device installed inside an electronic device for driving a keyboard module, the electronic device comprising a display module and a host module comprising a cover whereon an opening is formed, and the keyboard driving device comprising:

a keyboard module disposed in the opening of the cover of the host module, the keyboard module comprising:
 a supporting component connected to the cover;
 a frame disposed on the supporting component; and
 a plurality of keycaps disposed on the frame;
at least one pivoting module installed inside the host module and pivoted to the display module for rotating the display module in a first rotating direction relative to the host module, the at least one pivoting module comprising:
 a pivoting component pivoted to the display module, the pivoting component being driven to rotate when the display module is rotated relative to the host module;
 a linking component, an end of the linking component being rotatably connected to the pivoting component; and
 a driving device, an end of the driving device being connected to the keyboard module, the other end of the driving device being connected to the other end of the linking component, and the linking component moving with the pivoting component simultaneously in the first rotating direction, so as to drive the driving device to drive the frame to press the plurality of the keycaps in a first direction when the display module rotates in the first rotating direction relative to the host module.

17. The keyboard driving device of claim 16, wherein the driving device comprises:
 a first driving component, an end of the first driving component being pivoted to the other end of the linking component, and the other end of the first driving component being detachably connected to the frame; and
 a second driving component, an end of the second driving component being connected to the first driving component, the other end of the second driving component being connected to the cover, the pivoting component driving the linking component to rotate in a second rotating direction opposite to the first rotating direction as the display module rotates in the second rotating direction relative the host module, so as to drive the first driving component to rotate in the first rotating direction and to drive the second driving component to rotate in the second rotating direction, so that the first driving component drives the frame to move in a second direction opposite to the first direction.

18. The keyboard driving device of claim 17, wherein the driving device further comprises a pushing block disposed on the second driving component, and the pushing block contacts against the frame as the second driving component rotates in the second rotating direction, so as to drive the frame to move in the second direction.

19. The keyboard driving device of claim 18, wherein the supporting component of the keyboard module comprises two resilient structures respectively disposed under two sides of the frame for supporting the frame.

20. The keyboard driving device of claim 16, wherein a plurality of holes is formed on the frame, the plurality of the keycaps passes through the plurality of holes respectively, a protrusion is formed on a bottom of each keycap, and the frame presses the protrusion of each keycap as the driving device drives the frame to move in the first direction to drive the plurality of the keycaps.

* * * * *